United States Patent
Martin et al.

(10) Patent No.: US 11,226,741 B2
(45) Date of Patent: Jan. 18, 2022

(54) I/O BEHAVIOR PREDICTION BASED ON LONG-TERM PATTERN RECOGNITION

(71) Applicant: EMC IP Holding Company LLC, Hopkinton, MA (US)

(72) Inventors: Owen Martin, Hopedale, MA (US); Malak Alshawabkeh, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 51 days.

(21) Appl. No.: 16/175,947

(22) Filed: Oct. 31, 2018

(65) Prior Publication Data
US 2020/0133489 A1 Apr. 30, 2020

(51) Int. Cl.
*G06F 12/00* (2006.01)
*G06F 3/06* (2006.01)
*G06F 12/0802* (2016.01)
*G06N 3/08* (2006.01)

(52) U.S. Cl.
CPC ............ *G06F 3/061* (2013.01); *G06F 3/0646* (2013.01); *G06F 3/0679* (2013.01); *G06F 12/0802* (2013.01); *G06N 3/08* (2013.01); *G06F 2212/604* (2013.01)

(58) Field of Classification Search
CPC ...... G06F 3/061; G06F 3/0646; G06F 3/0679; G06F 12/0802; G06F 2212/604; G06N 3/08
See application file for complete search history.

(56) References Cited

U.S. PATENT DOCUMENTS

| | | | | |
|---|---|---|---|---|
| 5,051,887 A | * | 9/1991 | Berger | G06F 11/2082 711/162 |
| 5,566,315 A | * | 10/1996 | Milillo | G06F 12/0866 710/56 |
| 6,047,356 A | * | 4/2000 | Anderson | G06F 12/0866 707/999.104 |
| 6,651,245 B1 | * | 11/2003 | Damron | G06F 8/4442 711/213 |

(Continued)

OTHER PUBLICATIONS

Understanding LSTM Networks—colah's blog, "Understanding LSTM Networks," Aug. 27, 2015, http://colah.github.io/posts/2015-08-Understanding-LSTMs/.

*Primary Examiner* — Prasith Thammavong
(74) *Attorney, Agent, or Firm* — Muirhead and Saturnelli, LLC

(57) ABSTRACT

Described herein is a system, and related techniques, for predicting I/O requests that are not necessarily directed to sequential sectors of a physical storage device. In some embodiments, I/O patterns that do not involve sequential-sector access, and that may be relatively long-term patterns, may be recognized. To recognize such patterns, deep machine-learning techniques may be used, for example, using neural networks. Such neural networks may be a recurrent neural network such as, for example, an LSTM-RNN. I/O streams for a workstream may be sampled for specific I/O features to produce a time series of I/O feature values of a workstream, and this time series of data may be fed to a prediction engine, e.g., an LSTM-RNN to predict one or more future I/O features values, and I/O actions may be taken based on these predicted feature values.

16 Claims, 10 Drawing Sheets

(56) References Cited

U.S. PATENT DOCUMENTS

| | | | |
|---|---|---|---|
| 7,945,822 B1* | 5/2011 | Kimmel | G06F 11/1666 714/710 |
| 9,846,627 B2* | 12/2017 | Solihin | G06F 11/3452 |
| 10,372,345 B1* | 8/2019 | LeCrone | G06F 3/065 |
| 10,579,277 B1* | 3/2020 | Shanmugam | G06F 3/0665 |
| 10,803,197 B1* | 10/2020 | Liao | G06F 21/604 |
| 10,884,935 B1* | 1/2021 | Doddaiah | G06F 12/0842 |
| 2004/0205297 A1* | 10/2004 | Bearden | G06F 12/0804 711/133 |
| 2005/0050269 A1* | 3/2005 | Horn | G06F 11/3409 711/114 |
| 2005/0071596 A1* | 3/2005 | Aschoff | G06F 9/5016 711/170 |
| 2005/0071599 A1* | 3/2005 | Modha | G06F 12/0871 711/170 |
| 2005/0086437 A1* | 4/2005 | Modha | G06F 12/124 711/133 |
| 2006/0041732 A1* | 2/2006 | Sun | G06F 9/5016 711/170 |
| 2006/0143383 A1* | 6/2006 | Zohar | G06F 12/0866 711/118 |
| 2007/0186048 A1* | 8/2007 | Nakanishi | G06F 12/0862 711/137 |
| 2008/0109572 A1* | 5/2008 | Leijten | G06F 13/28 710/23 |
| 2009/0327303 A1* | 12/2009 | Ootjers | H04L 67/1097 |
| 2010/0011169 A1* | 1/2010 | Pothireddy | G06F 12/0862 711/137 |
| 2010/0268893 A1* | 10/2010 | Luttrell | G06F 12/0862 711/137 |
| 2013/0024625 A1* | 1/2013 | Benhase | G06F 12/12 711/136 |
| 2013/0024627 A1* | 1/2013 | Benhase | G06F 12/0862 711/137 |
| 2013/0173862 A1* | 7/2013 | Lu | G06F 12/0804 711/133 |
| 2014/0156910 A1* | 6/2014 | Uttamchandani | G06F 3/0685 711/103 |
| 2015/0324203 A1* | 11/2015 | Ashcraft | G06F 9/3838 711/125 |
| 2016/0253178 A1* | 9/2016 | Yamashita | G06F 9/3814 712/206 |
| 2017/0212842 A1* | 7/2017 | Khosrowpour | G06F 12/0804 |
| 2017/0322885 A1* | 11/2017 | Mukherjee | G06F 12/0862 |
| 2018/0157589 A1* | 6/2018 | Jayasena | G06F 12/0824 |
| 2018/0188970 A1* | 7/2018 | Liu | G06F 3/0659 |
| 2018/0189638 A1* | 7/2018 | Nurvitadhi | G06N 3/063 |
| 2018/0225124 A1* | 8/2018 | Gupta | G06F 9/30076 |
| 2019/0065375 A1* | 2/2019 | Al Sheikh | G06F 12/0875 |
| 2019/0319868 A1* | 10/2019 | Svennebring | H04L 43/0882 |
| 2019/0361811 A1* | 11/2019 | Saeki | G06F 12/0868 |
| 2019/0370632 A1* | 12/2019 | Hashemi | G06N 3/084 |
| 2021/0072901 A1* | 3/2021 | Kale | G06F 3/0613 |
| 2021/0182213 A1* | 6/2021 | Yin | G06F 12/122 |

* cited by examiner

I/O BEHAVIOR PREDICTION BASED ON LONG-TERM PATTERN RECOGNITION

BACKGROUND

Technical Field

This application generally relates to data storage processing and, in particular, predicting data storage workload behavior based on recognizing long-term behavioral patterns.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC. These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may initiate performance of read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

SUMMARY OF THE INVENTION

In some embodiments of the invention, a method is performed, including receiving a first I/O request for a storage device of a storage system, the first I/O request corresponding to a first storage location on the storage system, determining a difference between the first storage location and a second storage location on the storage system corresponding to a second storage I/O request for the storage device that immediately preceded the first I/O request, and predicting a third storage location corresponding to a next I/O request for the storage device based at least in part on the difference between the first storage location and the second location. The method may include performing one or more I/O actions based at least in part on the predicted third storage location, which may include at least one of the following: acquiring cache space for a write operation corresponding to the predicted third storage location; or prefetching data corresponding to the third storage location. The I/O request may specify a first I/O operation, and the method may further include determining a difference between the first I/O operation and a second I/O operation specified in a second storage I/O request for the storage device that immediately preceded the first I/O request and predicting a third I/O operation to be specified in a next I/O request for the storage device based at least in part on the difference between the first I/O operation and the second I/O operation. The method may further include performing a plurality of predictions of storage locations corresponding to I/O requests for the storage device prior to the first I/O request, calculating an accuracy value indicating a collective accuracy of the plurality of predictions and determining whether to perform one or more I/O actions in accordance with the predicted third storage location based at least in part on the accuracy value. Predicting the third storage location may include application of a prediction engine, and the method may further include performing a plurality of predictions of storage locations corresponding to I/O requests for the storage device prior to the first I/O request, calculating an accuracy value indicating a collective accuracy of plurality of predictions, and adjusting one or more parameters of the prediction engine based on the accuracy value. Predicting a third storage location may include determining a plurality of potential location difference values based on a plurality of I/O requests for the storage device received prior to first I/O request, each potential location difference value specifying a difference in storage location address, determining, for each potential location difference value, a probability value indicating a probability that the difference in storage location address specified by the potential location difference value will be within a predefined range of a difference in storage location address between the first storage location and a storage location corresponding to the next I/O request, selecting a potential location difference value having a highest probability value from among the determined probability values, and determining the third storage location based on the first storage location and the selected location difference value. Predicting may include applying a recurrent neural network, which may include an LSTM-RNN.

In some embodiments, a computer system is provided including one or more processors and a memory including code stored thereon that, when executed, performs the above-described method.

In some embodiments, one or more computer-readable media, for example, non-transitory computer-readable media, are provided having software stored thereon including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Figure 2B:
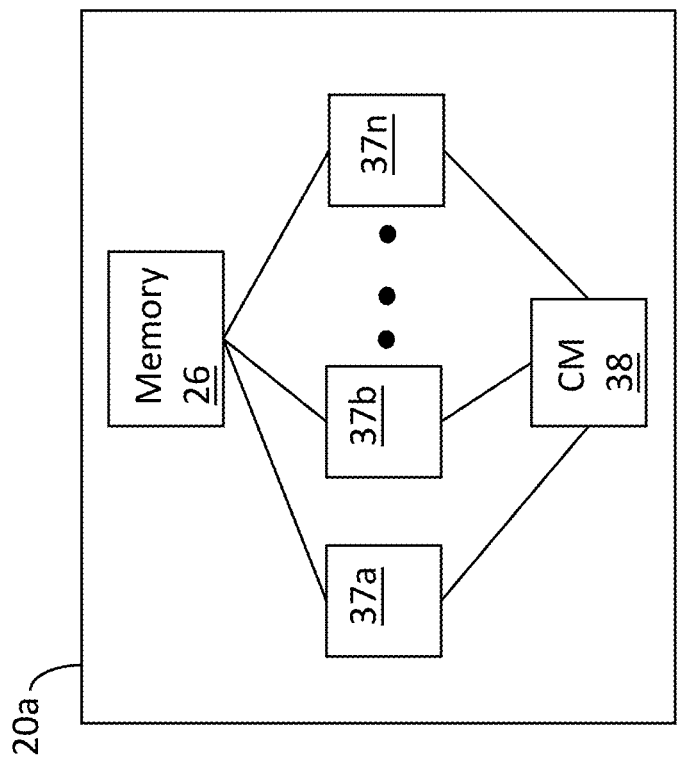
FIG. 2B is a block diagram illustrating an example of logical internal communications between directors and memory of the data storage system of FIG. 2A according to embodiments of the invention.

It is desirable in various aspects of data storage systems to be able to predict future I/O operations, for example, in cache management. Each I/O request from a host has a certain I/O processing overhead associated with it. For example, in response to an I/O request (e.g., a read or write request), a processing entity (e.g., a director or like entity) issues instructions to physical storage devices (e.g., disks or SSD storage (e.g., flash) of the storage system), the storage device processes the instructions and returns data to the processing entity that then processes the returned data. The amount of interaction between the processing entity and the physical storage devices may be reduced by caching data in the global memory or a local memory of the processing entity, which eliminates the need to fetch data from the physical storage devices, thereby reducing I/O processing overhead. By being able to predict an I/O operation, the processing entity may acquire cache slots and/or prefetch data, which may reduce the response time for the I/O operation when it is actually requested by a host, as the data already may be in cache.

Cache management itself has overhead as well. For example, in some storage systems, acquiring a cache slot (e.g., a 128-KB block) for a write operation takes about 10-15 µs. During an I/O sequence involving several writes in a relatively short period of time (e.g., a write burst), the overhead of acquiring cache slots can become quite substantial (e.g., for 100 write operations this acquisition may cumulatively take 1-1.5 ms). Thus, it is desirable to know if multiple write requests are coming soon, and to be able to consolidate the cache allocation required for many relatively small write requests into one larger allocation, and thus experience the overhead only once. More generally, any of a variety of I/O management functions can be improved by being able to predict future I/O behavior.

Some storage systems today have the ability to predict future I/O requests to sequential areas (e.g., sectors) (e.g., consecutive 128-KB blocks) of a non-volatile storage media (e.g., a disk or SSD), and thus cache slots may be pre-acquired, and data from the sequential sectors may be prefetched into the acquired cache slots in anticipation of the data being requested from these sectors (e.g., as part of a read or write operation). However, such storage systems may not be able to reliably predict I/O requests that are not sequential.

Described herein is a system, and related techniques, for predicting I/O requests that are not necessarily directed to sequential sectors of a physical storage device. In some embodiments, I/O patterns that do not involve sequential-sector access, and that may be relatively long-term patterns, may be recognized. More generally, long-term I/O patterns may be recognized, and long-term I/O behavior may be predicted.

To recognize such patterns, deep machine-learning techniques may be used, for example, neural networks. Such neural networks may be a recurrent neural network (RNN) such as, for example, a long short-term memory RNN (LSTM-RNN), which may be referred to herein as an "LSTM." Other types of neural networks may be used, albeit they may not be as effective in recognizing long-term patterns as LSTMs. An I/O workstream for a storage device may be sampled for specific I/O features to produce a time series of I/O feature values of a workstream, and this time series of data may be fed to a prediction engine, e.g., an LSTM, to predict one or more future I/O features values, and I/O actions may be taken based on these predicted feature values.

Any of a variety of I/O workstream features may be analyzed to determine patterns. For example, in some embodiments, the type of operation (e.g., read or write) in a time sequence of a workstream may be analyzed to predict a next type of I/O operation. Further, in some embodiments, the pattern of changes in storage locations (e.g., logical block address (LBA)) corresponding to a sequence of I/O requests for a storage device may be analyzed. For each I/O request of a workstream, the I/O features to be analyzed may be determined from the I/O request. For example, a change in storage device address and/or I/O operation type (e.g., read or write) from an immediately preceding I/O request may be determined. It should be appreciated that determining a change may include determining that there is no change, i.e., that the storage device address and/or I/O operation type for consecutive I/O requests are the same. These I/O features may be determined for a plurality of I/O requests within a workstream to form a time series of I/O features for the workstream. This time series of I/O features, or one or more sequential portions thereof, may be fed to a prediction engine (e.g., an LSTM), from which one or more predicted future I/O feature values may be determined. In some embodiments, the prediction engine produces a plurality of potential values for an I/O feature, e.g., in the form of a vector, and a next value of an I/O feature may be predicted based on the probability of each value. For example, the potential value having the highest probability may be selected as the predicted value.

In some embodiments of the invention, one or more I/O actions may be performed as a result of the predicted value, for example, a cache slot may be acquired and data may be prefetched thereto. In some embodiments, such an action will not be performed unless one or more conditions are met. For example, one or more prediction accuracy measurements may be maintained and updated. That is, each time an actual I/O feature for an I/O request is determined, it may be compared against the previously predicted value for the I/O feature, and the one or more prediction accuracy measurements may be updated accordingly. The updated measurement then may be compared against a predefined threshold, and the one or more I/O actions may not be performed unless this threshold is satisfied. Further, in some embodiments, if the highest probability of potential values for an I/O features does not satisfy a predefined threshold, the one or more I/O action may not be performed. Thus, in some embodiments, if there is not enough confidence in the accuracy of the predicted value of the I/O feature, the one or more I/O actions may not be performed, which may save unnecessary use of storage system resources.

While some embodiments described herein are directed to use of I/O features of storage address change and I/O operation-type change for prediction of I/O behavior, it should be appreciated that the invention is not so limited, as any of a variety of I/O features may be used. Further, other I/O actions, which may or may not involve cache, may be performed as a result of the prediction. For example, any of a variety of I/O actions may be performed in relation to data migration, movement (e.g., promoting or demoting) of data between tiers, replication, backup, encryption, data deduplication, RAID management, other forms of data protection and reduction, or other data storage-related activities.

Illustrative embodiments of the invention will now be described in more detail in relation to the figures.

Figure 1:
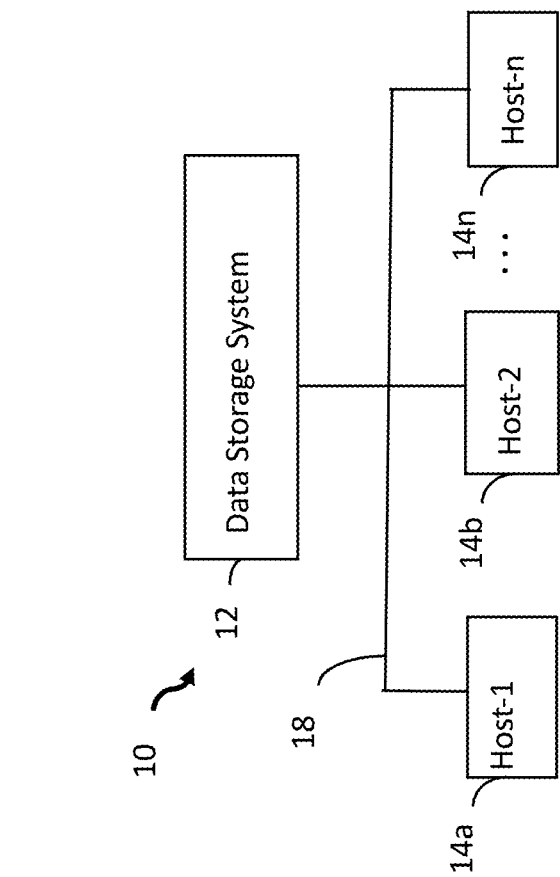
FIG. 1 is a block diagram illustrating an example of a system according to embodiments of the invention.

Referring now to FIG. 1, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, also may be located in different physical locations. Communication media that may be used to provide the different types of connections between the host computer systems and the data storage system of the system 10 may use a variety of different communication protocols such as, for example, SCSI, ESCON, Fibre Channel, iSCSI, FCoE, GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
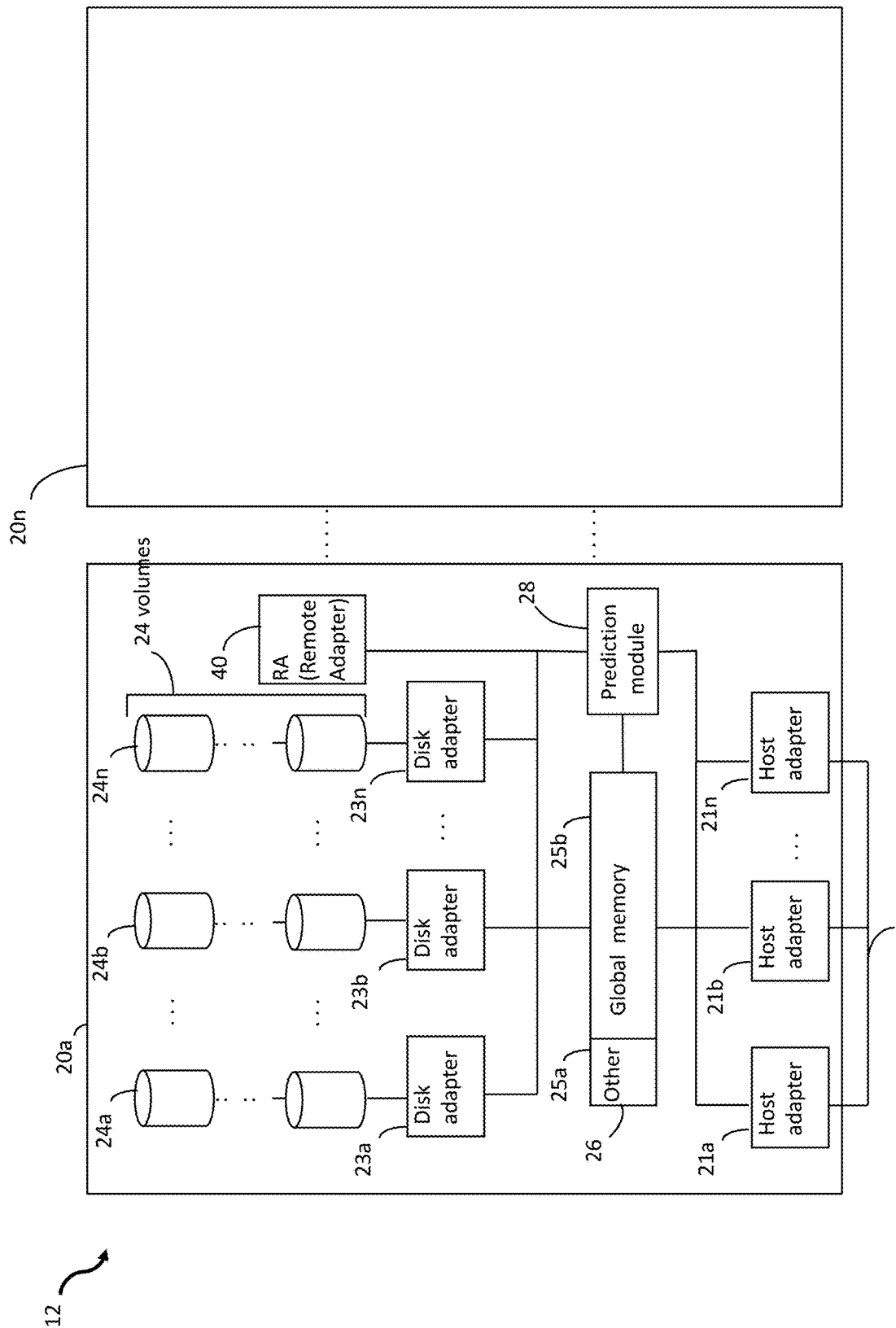
FIG. 2A is a block diagram illustrating an example of a data storage system according to embodiments of the invention.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a also may include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25*b* may be used to facilitate data transfers and other communications between the DAs, HAs and RAs in a data storage system. In one embodiment, the DAs 23*a*-23*n* may perform data operations using a cache that may be included in the global memory 25*b*, for example, in communications with other disk adapters or directors, and other components of the system 20*a*. The other portion 25*a* is that portion of memory that may be used in connection with other designations that may vary in accordance with each embodiment.

It should be generally noted that the elements 24*a*-24*n* denoting data storage devices may be any suitable storage device such as a rotating disk drive, flash-based storage, and the like. The particular data storage system as described in this embodiment, or a particular device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25*b*) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of LUNs. The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

In some embodiments, the storage system 20*a* includes a prediction module 28 that may be configured to perform one or more aspects of I/O behavior prediction as described herein, which may include implementing a prediction engine as described herein. Prediction module 28 may be any suitable combination of software, firmware and hardware. For example, prediction module 28 may be, or include, hardware specifically designed and/or programmed to perform one or aspects of I/O behavior prediction described herein such as, for example, an application-specific integrated circuit (ASIC), a system on chip (SoC), a programmed field programmable gate array (FPGA), other types of hardware or any suitable combination of the foregoing. In some embodiments, prediction module 28 may be, or include, software including instructions to perform one or more aspects of I/O behavior prediction described herein. In some embodiments, prediction module 28 may include one or more CPUs, graphical processing units (GPUs) or other types of processors or controllers, configured to execute software to perform one or more aspects of I/O behavior prediction described herein. The parallel processing capabilities of GPUs may be particularly well-suited to perform embodiments of I/O behavior prediction described herein that utilize neural networks, for example, LSTMs. In some embodiments, directors and other components of the storage system may be configured to offload I/O behavior prediction processing to the prediction module 28, thereby conserving director resources to perform other I/O-related tasks.

Referring to FIG. 2B, shown is a representation of the logical internal communications between the directors and memory included in a data storage system according to some embodiments of the invention. Included in FIG. 2B is a plurality of directors 37*a*-37*n* coupled to the memory 26. Each of the directors 37*a*-37*n* represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

In some embodiments of the invention, a prediction engine in the form of an LSTM may be used to predict future I/O values. LSTMs build upon the concept of neural networks by adding additional control elements to the cells of the neurons. These control elements allow for the cell to interact with the input stream in a more dynamic way by being capable of triggering a reset or a "forget" type of behavior. In the context of transactional types of applications, these capabilities are useful because the LSTM can learn when a new transaction is starting and discard whatever state has been built up from the previous transaction. For example, if a sequence of a transaction is: read→modify→write, the LSTM can recognize the beginning of the sequence and forget the information about the previous transaction that has already ended (e.g., with the "write" in the foregoing sequence).

Since the past often plays a critical role in predicting the future, it may be desirable to analyze the workload history of an application to predict I/O behavior. For such analysis, a prediction model may try to extract a pattern from the historical workload data of an application. The extracted pattern then may be used to forecast the upcoming workload. For example, n continuous previous samples of an application workload may be used in predicting a future workload, and it may be taken into consideration that most recent events have a greater impact of future events than older events.

Deep-learning networks or deep-structured-learning networks can be defined as a special kind of neural network composed of multiple layers. These networks are considered better than traditional neural networks in persisting information from a previous event. A recurrent neural network (RNN) is one such network, and includes a combination of neural networks in a loop. The networks in the loop allow the information to persist. Each network in the loop takes input and information from the previous network and performs the specified operation and produces output along with passing the information to the next network. Some applications require only recent information while others may need more information from the past. Common RNNs may be acceptable when only recent information is required for an application, and in some embodiments of the invention, such an RNN may be used to predict I/O behavior. However, common RNNs are often insufficient in learning a pattern as the gap between required previous information and the point of requirement increases.

LSTMs are a special type of RNN capable of learning patterns over a longer term, i.e., when the gap between the required information and current point of requirement is great. LSTMs are good at remembering information for a long time. Since older information may affect the accuracy of a model for recognizing long-term behavior, LSTMs become a natural choice of use for such models.

Figure 3:
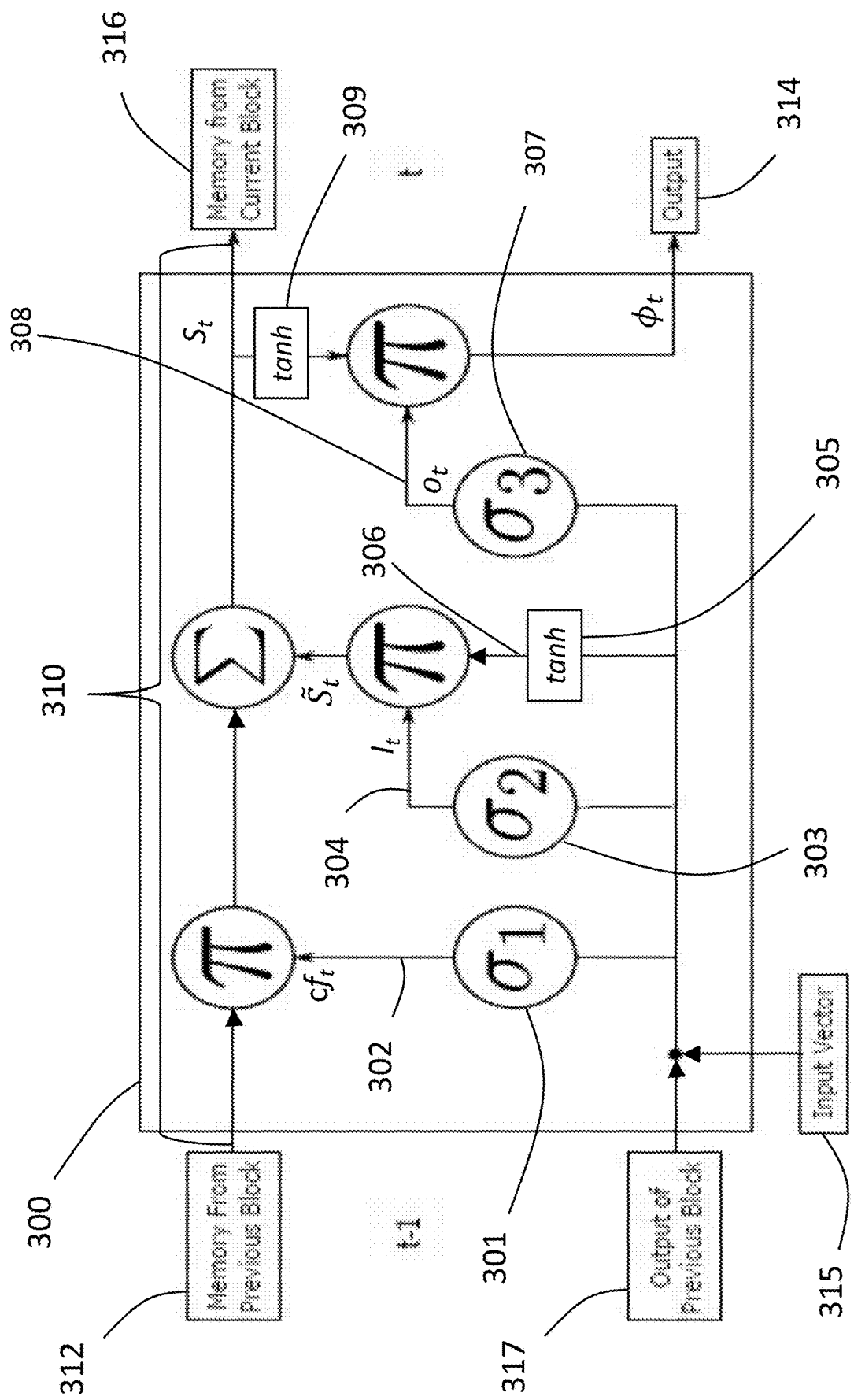
FIG. 3 is a block diagram illustrating an example of an LSTM-RNN module according to embodiments of the invention.

FIG. 3 is a block diagram illustrating an example of a module (or "block") 300 of an LSTM according to embodiments of the invention. Other embodiments of an LSTM module, for example, variations of LSTM module 300, are possible and are intended to fall within the scope of the invention. In some embodiments, another type of RNN, for example, another type of RNN well-suited for recognizing long-term patterns in time series data, may be used. In FIG. 3: each line connecting elements represents a data vector; a line with an arrow represents a vector transfer between module elements; lines converging together represent a concatenation of vectors; lines diverging represent copies of the same vector; Σ represents vector addition; and Π represents vector multiplication.

LSTM module 300, which may be referred to as a "repeating module" for reasons that will become more clear by further details provided herein, has four neural network layers 301, 303, 305 and 307 interacting in a unique fashion. Layers 301, 303 and 307 are gate activation functions, and layer 305 and output activation function 309 serve as output activation functions. The following Equations 1-6 define values of the outputs of various components of LSTM module 300, where $x_t$ is the input vector 315 and $\phi_{t-1}$ is the output of the previous module 317, $W_x$ is a coefficient matrix and $b_x$ is a bias vector:

Equation 1: $cf_t = \sigma_1(W_{cf}\cdot[\phi_{t-1}, x_t] + b_{cf})$ = output of neural network layer 301 at 302;

Equation 2: $I_t = \sigma_2(W_I\cdot[\phi_{t-1}, x_t] + b_I)$ = output of neural network layer 303 at 304;

Equation 3: $\tilde{S}_t = \tanh(W_s\cdot[\phi_{t-1}, x_t] + b_s)$ = output of neural network layer 305 at 306;

Equation 4: $S_t = cf_t\cdot S_{t1} + I_t\cdot \tilde{S}_{t1}$ = memory of current module 300 at 316;

Equation 5: $o_t = \sigma_3(W_o\cdot[\phi_{t-1}, x_t] + b_o)$ = output of neural network layer 307 at 308; and Equation 6: $\phi_t = o_t \times \tanh(S_t)$ = the output of current module 300 at 314.

A fundamental component of LSTM module 300 is cell state 310, represented by a line running from Memory from Previous Block ($S_{t1}$) 312 to Memory from Current Block ($S_t$) 316. The cell state 310 allows for information to flow straight down a line of repeating modules. Using the gate activation functions 301, 303 and 307 and output activation functions 305 and 309, the degree of information flow to/from module 300 from a previous repeating module and a next repeating module can be controlled, i.e., as the memory of the current module 300 at 316 as defined by Equation 5. For example, based on values of parameters for gate activation functions 301, 303 and 307 and output activation functions 305 and 309, one or more values of an input vector 315 may be used or not used (i.e., rejected) by a module. The probability that a module will not use a vector value may referred to as "dropoff," with a high dropoff meaning that a there is a higher probability that a module will reject a vector value, for example, to avoid "overfitting" a model, so that the LSTM can be more sensitive to dominant trends in the data (embodied in the vectors) it is analyzing. It should be appreciated that the function tanh pushes each vector value it received to be between −1 and 1.

Figure 4:
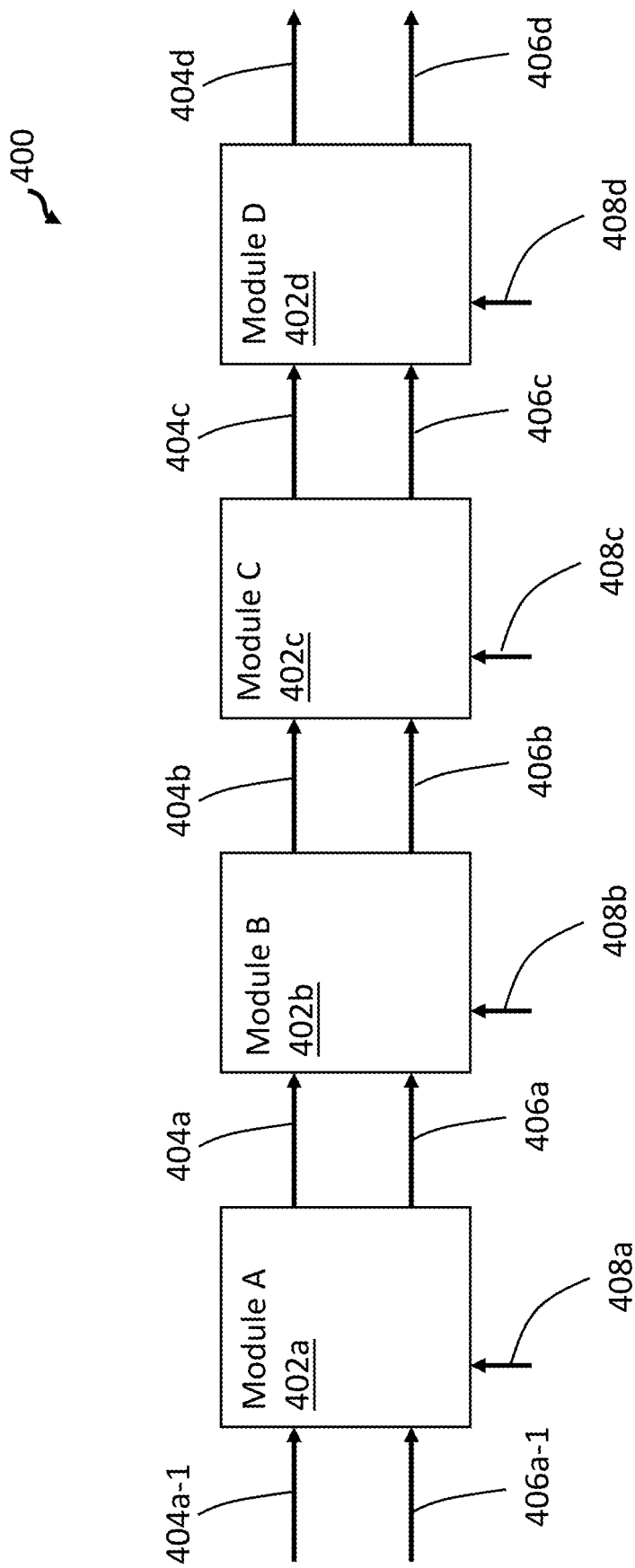
FIG. 4 is a block diagram illustrating an example of an LSTM-RNN according to embodiments of the invention.

FIG. 4 is a block diagram illustrating an example of an LSTM 400 for predicting I/O, including a plurality of repeating modules $402_{a-d}$. Each of modules $402_{a-d}$ receives: a memory from a previous module $404_{a-1}$-$404_c$, an output from the previous module $406_{a-1}$-$406_c$, and an input vector $408_{a-d}$-$408_d$. Each of modules $402_{a-d}$ outputs to a next module: current memory $404_a$-$404d$ and output vector $406_a$-$406_d$. Other embodiments of an LSTM for predicting I/O, for example, variations of 400 or other types of neural networks, are possible and are intended to fall within the scope of the invention. FIG. 4 illustrates that each repeating module $402_{a-d}$ receives an input vector (e.g., a sample of I/O feature values of a time series of I/O feature data) as well as an output from a previous module that received an input vector from (e.g., an immediately preceding sample of I/O feature values of a time series of I/O feature data). As will be described in more detail herein, each of the input vectors $408_a$-$408_d$ may be configured to receive a vector of one or more element, for example, each vector element representing a sample of I/O feature data of a time series of I/O feature data derived from an I/O request stream, for example, for a particular storage device. Each vector element itself may include a plurality of feature elements for a given I/O data sample. That is, each of the input vectors $408_a$-$408_d$ may be a multi-dimensional vector; i.e., a vector of vectors. For example, a vector element of an input vector, the vector element corresponding to given I/O data sample, may include a first feature element representing an LBA change value for the sample and second feature element representing an operation change value for the sample. Although only four LSTM modules are illustrated, the number of instances (or number of active modules in a hardware/firmware embodiment) at any given time may vary depending on how the LSTM is implemented, including how much parallel processing is desired and/or possible given the constraints of the implementation (e.g., prediction module 28 of system 12).

The learning capacity of an LSTM may scale relative to the number of LSTM modules (i.e., neurons) implemented and the number of layers within the modules, which means that it's learning capacity may be limited to a certain number of permutations or interactions based on the amount of memory and compute resources that are dedicated to it. Thus, various parameters of the LSTM may be configured and adjusted to balance the learning capacity of the LSTM and resource consumption.

An LSTM or other type of RNN may be used to predict I/O behavior of an application, for example, patterns of one or more I/O features for one or more storage devices. In some embodiments, an LSTM may be used to predict an address on a storage device of a next I/O operation and/or the type of I/O operation (e.g., read or write) based on a pattern of address changes and operation changes between consecutive I/O requests for the storage device in an I/O workstream, i.e., a time series of I/O operations. That is, the LSTM may be configured to recognize a pattern of address changes (e.g., LBA changes) within an I/O workstream for a storage device. For illustrative purposes, the term "LBA change" is often used herein to indicate a change in storage device address, but it should be appreciated that address changes may be specified in accordance with logical representations other than an LBA. It may be desirable to recognize patterns of LBA changes because applications often exhibit a pattern of LBA change; i.e., an LBA change signature. Recognizing patterns of LBA changes instead of patterns of the LBAs themselves may be desirable because in some cases the actual LBAs within a repeating LBA-change pattern may be different. That is, the actual LBA may not repeat, but the LBA change does repeat. For example, in an application, a same transaction type may be performed on different data. The sequence of I/O operations (e.g., read, write, read, read, write, etc.) may be the same for the different data, and may produce the same pattern of LBA change on a storage device, but because the data is different, the LBAs themselves may be different, thus not producing a pattern of LBAs between the transactions on the different data. Thus, applying an LSTM or other RNN to recognize LBA change patterns may produce greater accuracy than attempting to recognize a pattern in LBAs themselves.

Figure 5:
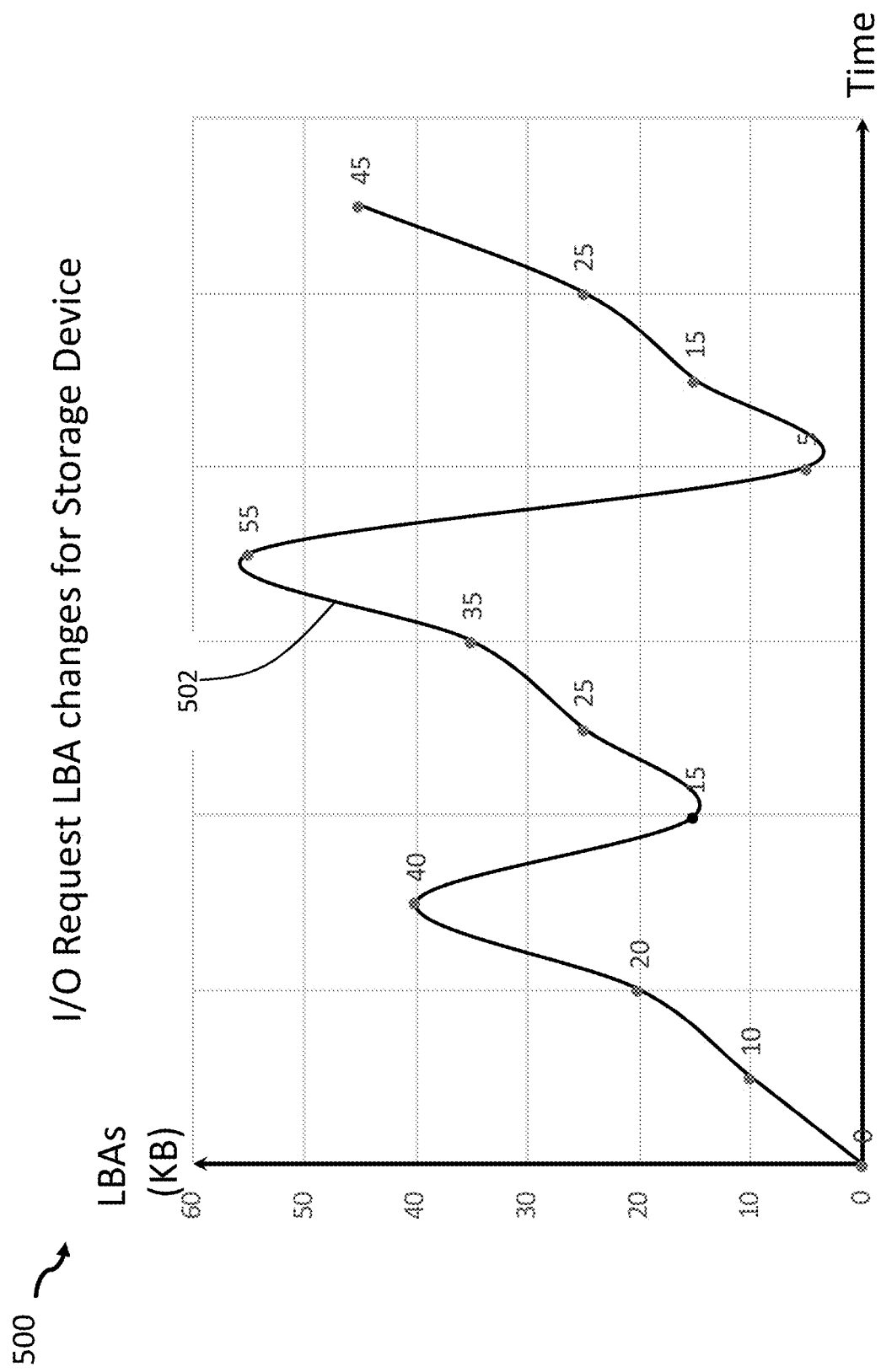
FIG. 5 is a chart illustrating an example of an I/O behavior pattern, according to embodiments of the invention.

FIG. 5 is a chart 500 illustrating an example of an I/O behavior pattern 502, according to embodiments of the invention. In the example of FIG. 5, the I/O behavior pattern 502 is an LBA change pattern, but other I/O behavior patterns may be used. The x-axis represents time, and the Y-axis represents LBAs, for example, in 8 KB units for reasons described in more detail elsewhere herein. The LBA change pattern 502 may be the result of 3 consecutive application transactions of the same type on data of a same data storage device. The LBA change pattern has 12 data points including a three-point pattern that repeats three times: +10, +10, +20, after which there is a drop in LBA and the pattern repeats. This pattern may represent the same three I/O operations of a transaction being applied three times in succession on different data.

Figure 6:
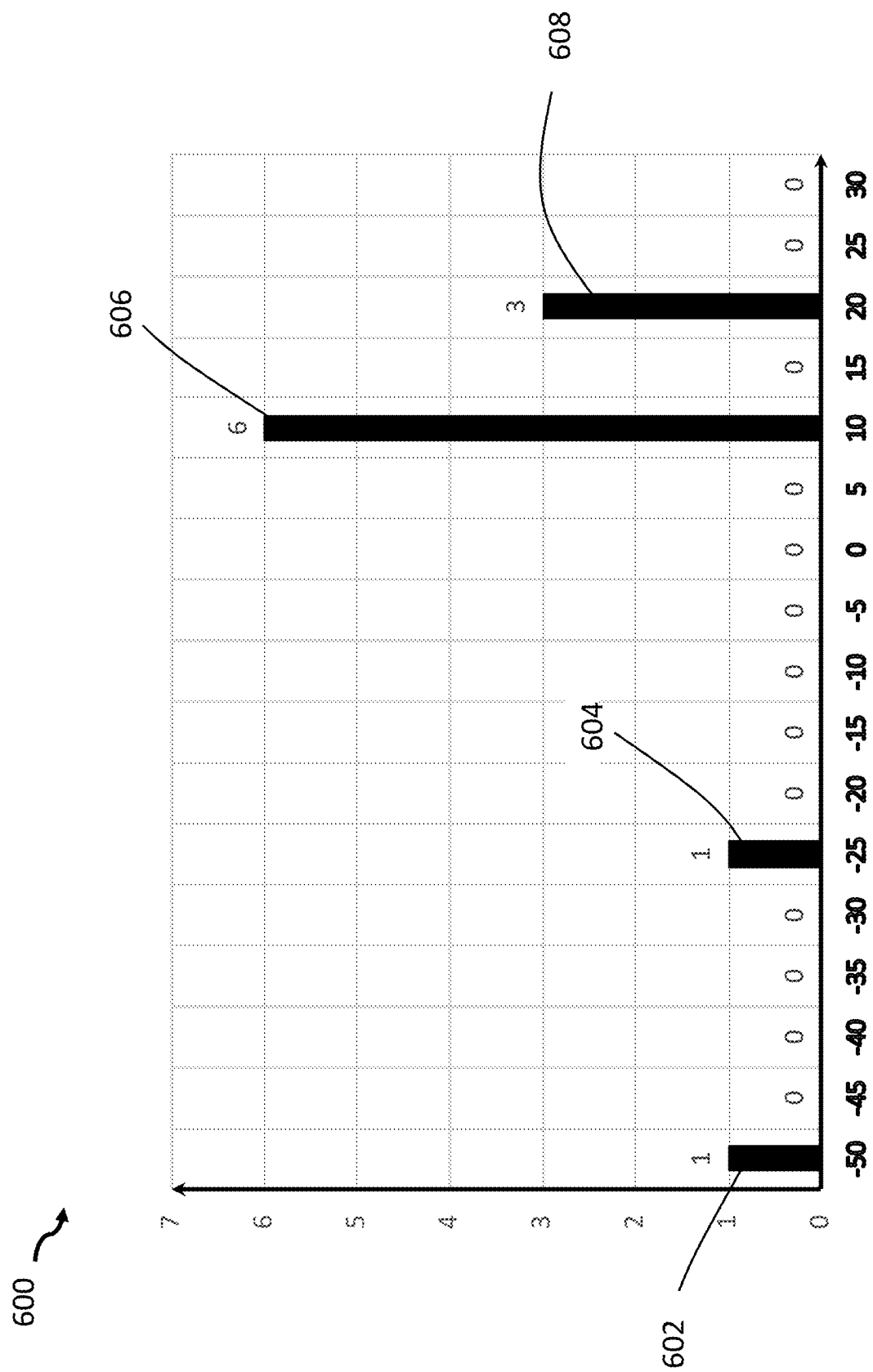
FIG. 6 illustrates an example of a histogram of I/O behavior, according to embodiments of the invention.

FIG. 6 illustrates an example of a histogram 600 of I/O behavior, according to embodiments of the invention. The example of FIG. 6 is a histogram 600 of the LBA changes illustrated in the chart 500 described in relation to FIG. 5. Histogram 600 includes four bars 602, 604, 606 and 608 representing, respectively: one LBA change of −50, one LBA change of −25, 6 LBA changes of +10 and 3 LBA changes of +20. The relevance of such a histogram to embodiments of the invention is described in more detail elsewhere herein.

It should be appreciated that the pattern 502 and resulting histogram 600 are relatively simple for illustrative purposes, whereas actual LBA change patterns may be far more complex, having hundreds, thousands, millions or even more LBA-change data points. Other examples of LBA change values and other I/O features are described below in more detail in relation to Table 1. Recognizing these patterns may require complex computation capability and the ability to remember data from much earlier than the time at which the pattern recognition is being performed, for which an LSTM may be well suited.

Figure 7:
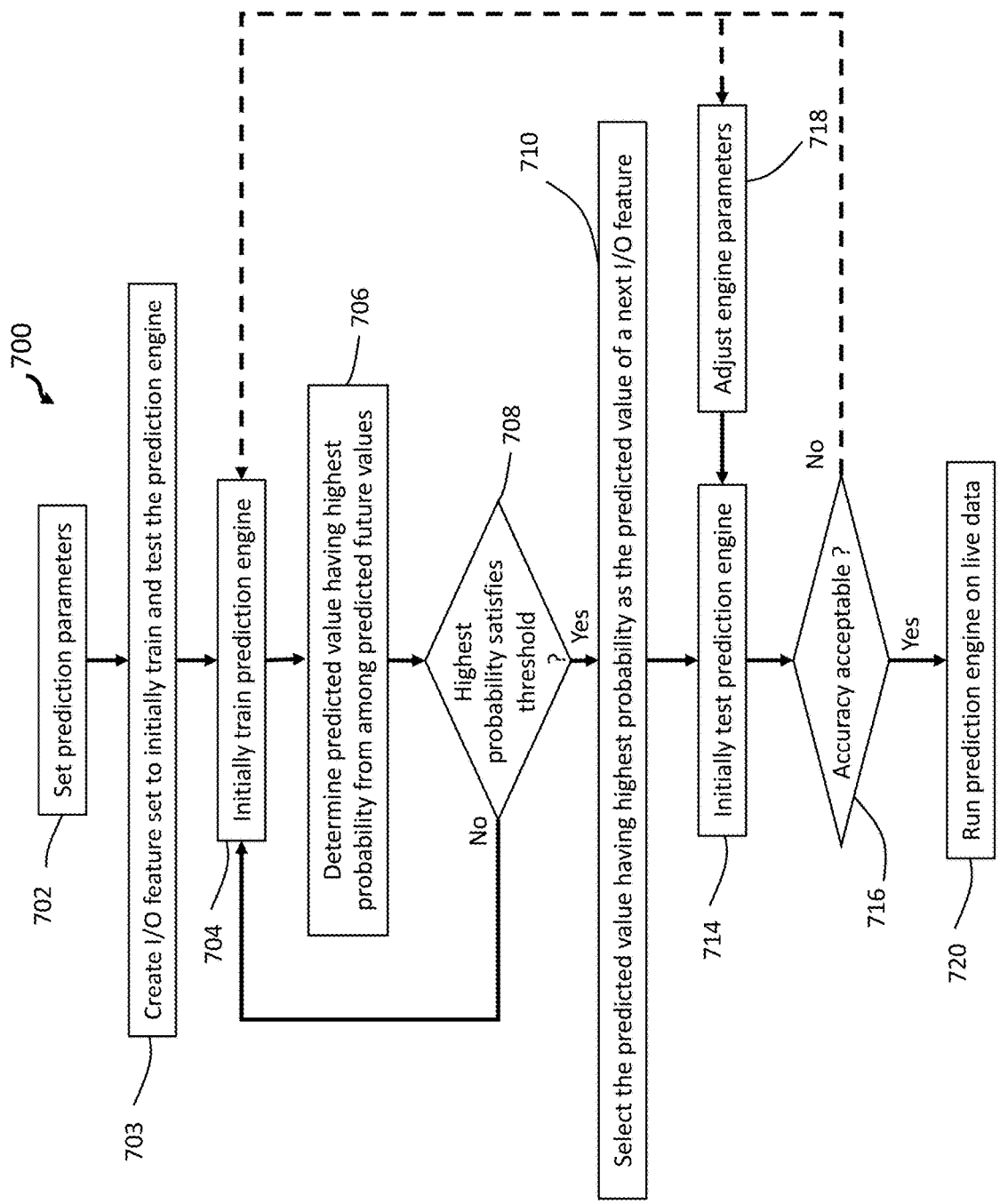
FIG. 7 is a flowchart illustrating an example of a method of performing prediction of I/O behavior, according to embodiments of the invention.

FIG. 7 is a flowchart illustrating an example of a method 700 of performing prediction of I/O behavior. Other embodiments of method of performing prediction of I/O behavior, for example, variations of method 700, are possible and are intended to fall within the scope of the invention. In step 702, one or more prediction parameters may be set. These parameters may include the one or more I/O features for which prediction will be performed, for example, storage address (e.g., LBA) change, I/O operation change or any of a variety of other I/O features. Other parameters may include: training sample size; look-back window size; and gradient descent optimizer. The training sample size may be expressed as a unit of time (e.g., 30 seconds, 60 seconds, 5 minutes) or as a number of samples (e.g., several hundred thousand, several million or another number). The number of samples resulting from the predefined time or the specified number of samples represents the number of I/O requests that will be used to train the prediction engine ("training samples"). For example, a 60-second sample size may result in up to several million I/O requests or even more (e.g., for a single storage device or multiple storage devices), and thus resulting in several million samples or even more.

The look-back window size may define how far back—i.e., how many samples back—each block of the LSTM should look when generating output values, which may define the size of an input vector for the LSTM; i.e., the size of each input vector to each block of the LSTM. The look-back window size also may be used to set values for parameters of gate activation functions and the output activation functions (e.g., see Equations 1-6) of the LSTM, for example, forgetting gate parameters, that control how much weight is given to input vector elements and elements of output vectors from previous blocks in calculating the output vector. Thus, in embodiments using an LSTM, setting parameters in step 702 also may include setting values for parameters of the gate activation functions and the output activation functions of the LSTM.

The LSTM may be configured to perform any of a variety of gradient descent optimization algorithms (optimizers) for minimizing prediction error. In some embodiments, the LSTM may be configured to apply an Adam optimization algorithm. A first phase of training the LSTM may result in error measurements resulting from a training (e.g., an initial training) of the LSTM that may be applied to later trainings. The specified optimizer of the LSTM may be applied along with the error measurements to the LSTM, and the LSTM may learn and adjust its parameters (e.g., one or more parameters defined in Equations 1-6 above) to produce a fastest decline in error, as the optimizer naturally gravitates toward as global minimum.

Setting parameters in step 702 also may include establishing one or more prediction thresholds including, for example, one or more prediction accuracy thresholds, and a prediction probability threshold. The one or more prediction accuracy thresholds may include a threshold percentage of correct predictions or ratio of correct-to-incorrect predictions, or a threshold average prediction error (e.g., average difference between the predicted LBA change and the actual LBA change). The prediction probability threshold may be a threshold for a calculated probability of a next I/O feature value that needs to be satisfied in order to take any action based on the prediction, as described in more detail elsewhere herein. Any of a variety of other prediction parameters may be set in step 702, for example, any other parameters described herein, and different parameters may be set and/or adjusted prior to or during training or use of the prediction engine, for example, as a result of testing, as is described in more detail elsewhere herein.

In step 703, an I/O feature set may be created to initially train and test the prediction engine. For example, a data set of one or more samples of I/O features (e.g., a time series of feature data) may be created, and then some of this data set may be used to initially train the prediction engine. The amount of sample data may be selected to be sufficient to provide a sufficient amount of recurring behavioral patterns for the prediction engine to recognize such patterns and predict a next I/O feature, where such an amount may be based on prior empirical analysis. As is described in more detail elsewhere herein, the prediction engine may be trained any number of times after the initial training.

The I/O feature set may be derived from a time series of I/O requests of a workstream. For example, for each I/O request sampled, a change in LBA and/or change in I/O operation (e.g., read or write) between the immediately preceding I/O request for the storage device and the current I/O request may be determined. The change in LBA may be rounded off to a nearest unit of LBA range of a predetermined size, for example 8 KB. That is, LBA changes may be determined in units of 8K (or another predefined amount), and raw LBA changes between consecutive I/O requests may be down-sampled to an 8K-LBA-change unit. For example, it may be determined that there is a raw LBA change of +54,138 bytes from an immediately preceding I/O request ($IO_{t-1}$) to the current I/O request ($IO_t$), and this may be down-sampled to an 8K unit change of +7, as 7× (+8K)=+56K is the nearest 8K unit. As another example, it may be determined that there is a raw LBA change of −9,564 bytes from $IO_{t-1}$ to $IO_t$, and this may be down-sampled to an 8K unit change of −1, as 1×(−8K)=−8K is the nearest 8K unit. Other predetermined sizes of LBA change units may be used, and such sizes may be based on one or more aspects of a storage system, including sizes (including size limitations and optimum sizes) of data units produced and/or processed by one or more logical or physical components of the system such as, for example, storage track size, sector size, cache slot size, sizes imposed or specified by storage and communication protocols, etc.

Table 1 illustrates an example of an I/O feature set including a plurality of samples, which may be obtained from an I/O request stream for a storage device. Each row (e.g., entry) may represent a sample of information determined from an I/O request. Each sample may include a timestamp (i.e., illustrated in the first column) corresponding to a time at which the underlying data was sampled, and four features, illustrated by the remaining four columns. The second column labeled "LBA" is the LBA (expressed in down-sampled 8K units) of the I/O request, the third column labeled "Op" is the I/O operation of the I/O request, the fourth column labeled "Delta Sector8k" is the LBA change in 8K units from immediately preceding I/O request, and the fifth column labeled "Delta op" is the change in operation from the immediately preceding I/O request. The values from the Delta Sector8k column and Delta op column can be used to form one or more I/O feature input vectors of an LSTM. For example, the second row represents a sample having a time stamp of 1327, and having features of: a write operation directed to a down-sampled 8K LBA of 84786688; representing a down-sampled 8K LBA change of −106679952 from the previous sample in the first row; and no change in operation from the previous row, as both operations are write operations, as indicated by the value "WriteWrite." A change in I/O operation from a read to a write could be indicated using "ReadWrite," and a change in I/O operation from a write to a read could be indicated using "WriteRead."

TABLE 1

Example of I/O Features for Prediction

| Timestamp | LBA | Op | Delta Sector8k | Delta op |
|---|---|---|---|---|
| 0 | 191466648 | Write | N/A | N/A |
| 1327 | 84786688 | Write | −106679952 | WriteWrite |
| 3922 | 84813208 | Write | 26512 | WriteWrite |
| 5134 | 191466648 | Write | 106653440 | WriteWrite |
| 6270 | 84786696 | Write | −106679952 | WriteWrite |
| 97031 | 191466648 | Write | 106679952 | WriteWrite |
| 98718 | 84813216 | Write | −106653424 | WriteWrite |
| 99680 | 84786688 | Write | −26528 | WriteWrite |
| 100898 | 191466648 | Write | 106679952 | WriteWrite |

Figure 8:
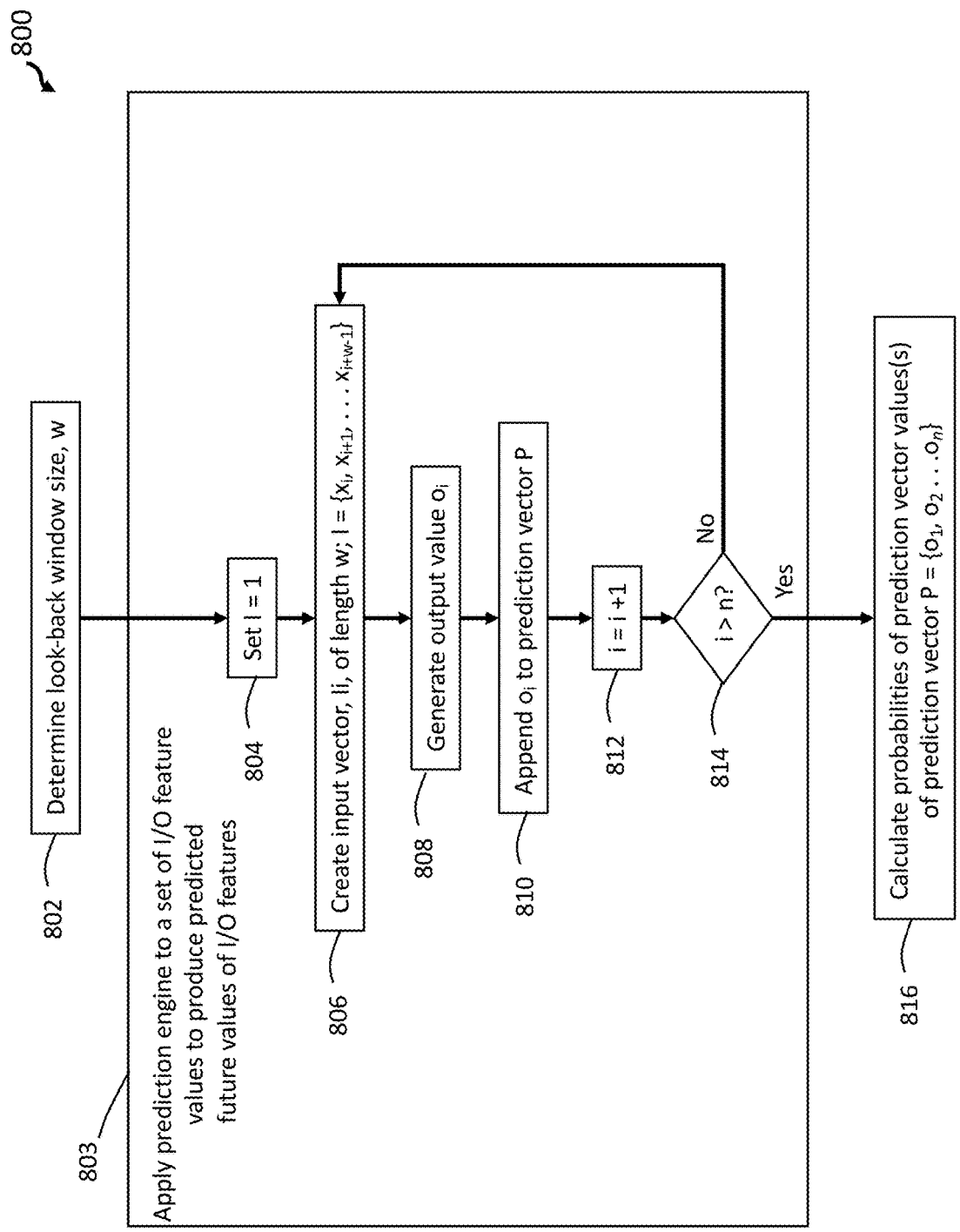
FIG. 8 is a flowchart illustrating an example of a method of training an I/O prediction engine, according to embodiments of the invention.

In step 704, the prediction engine may be initially trained, for example, as described in more detail in relation to FIG. 8, which will now be described. FIG. 8 is a flowchart illustrating an example of a method 800 of training an I/O prediction engine, according to embodiments of the invention. Other embodiments of training an I/O prediction engine, for example, variations of method 800, are possible and are intended to fall within the scope of the invention.

In step 802, a look-back window size may be determined, for example, from a predetermined set of prediction parameters as described elsewhere herein, by manual input (e.g., from a system administrator) or otherwise. In step 803, a prediction engine may be applied to a set (e.g., time series) of I/O feature values to produce a set of predicted future value(s) of I/O features for a next one or more I/O request(s); e.g., for a storage device. For a given set of n I/O features values representing a time series of the last n I/O feature values observed for a storage device, the set of predicted values may represent the predicted feature values of the next n I/O operations. For example, the set of n I/O feature values may be fed in the prediction engine to produce/output a prediction vector of the next n I/O feature values. In some embodiments, step 803 may include steps 804-814. An illustrative embodiment of the performance of steps 804-814 will now be described, using the I/O feature data of Table 1 as an example. In this illustrative embodiment, the feature set is of size n=9, which is the number of rows having feature values in Table 1, and the look-back window size=4. While feature values for multiple different features could be determined (e.g., I/O operation change and LBA change), in this example, only the LBA change will be used. Thus, the I/O feature set=$\{x_1, x_2, \ldots x_9\}$={0, −106679952, +26512, +106653440, −106679952, +106679952, −106653424, −26528, +106679952}.

In step 804, iteration variable i may be set to 1, and in step 806, an input vector $I_i$ of length w, $\{x_i, x_{i+1}, \ldots x_{i+w-1}\}$, may be created. For example, using the current example, for i=1, an input vector $I_i$={0, −106679952, +26512, +106653440} may be created. In step 808, an output value $o_1$ may be generated by the prediction engine from input vector $I_1$. For example, in an embodiment in which the prediction engine is an LSTM as described in relation to FIGS. 3 and 4, input vector $I_i$ may be fed to the LSTM module 300 as input vector 315. On this first iteration (i=1), the output of previous block 317 may be initialized to 0, as there is no previous block. Equations 1-6 may be applied to the input vector $I_1$ to produce output value 314=$o_1$.

In step 810, the output value $o_i$ may be appended to a prediction vector P. After the first iteration, the prediction vector P=$\{o_1\}$. In step 812, the iteration value may be incremented by 1, i=i+1, and then in step 814 it may be determined if the iteration value is greater than the number of feature values in the set; i.e., is i>n. In the current example, during a first iteration, step 812 produces i=1+1=2, and step 814 performs the comparison: is 2>9. If the comparison in step 814 is true, then method 814 may proceed to step 816, whereas if the comparison in step 814 is false, as it is in our example, method 800 may return to step 806.

In a second iteration through steps 806-810 for the current example, when i=2, in step 806 $I_2$={−106679952, +26512, +106653440, −106679952} may be created, and output value $o_2$ may be generated in step 808 by application of LSTM 300 and Equations 1-6. During this iteration (i=2) and all future iterations after the first iteration, the output of previous block 317 would be the output $o_{i-1}$ produced by the previous iteration. In step 810, the output value $o_2$ may be appended to a prediction vector P to produce prediction vector P=$\{o_1, o_2\}$. In step 812, i may be incremented: i=2+1=3, and in step 814 it may be determined that 3 is not greater than 9, and method 800 may return to step 806.

In the current example, steps 806-814 may be repeated until at the end of the $9^{th}$ iteration i is incremented to 10 in step 812, and in step 814 it is determined that 10 is greater than 9 in step 814 and method 800 proceeds to step 816. The resulting prediction vector P=$\{o_1, o_2 \ldots o_9\}$. It should be appreciated that, in some embodiments, the length of prediction vector P is the same as the length of the set of I/O feature values=n.

It should be appreciated that, for the last w−1 iterations of step 806-810, at least one of the input vector values=$\{x_i, x_{i+1}, \ldots x_{i+w-1}\}$ will include a value that was not in the original I/O feature value set. For example, in the current example, given n=9, when i=7 (n−2), 8 (n−1) or 9 (n), respectively, $I_7$={−106653424, −26528, +106679952, $x_{10}$}, $I_8$={−26528, +106679952, $x_{10}$, $x_{11}$} and $I_9$={+106679952, $x_{10}$, $x_{11}$, $x_{12}$}, respectively. In these cases, I/O feature values $x_{10}$, $x_{11}$ and $x_{12}$ should be first gathered and sampled to effectively produce a future predicted value.

During the training of the prediction engine, the prediction engine is adaptively learning and autonomously adjusting various parameters, including, in an embodiment in which the prediction engine includes an LSTM, parameter values of gate activation functions, output activation functions, Equations 1-6, other parameter values, or any suitable combination of the foregoing, such that it becomes more accurate in predicting future I/O feature values over time. The values of Table 1 are being used for illustrative purposes only. It should be appreciated that the size of the I/O feature data set may be any value, and may be significantly larger than 9, perhaps including millions of I/O feature values or even more, and the look-back window may be any value, including a value significantly larger than 4.

In step 816, for each predicted value in prediction vector, P, a probability of each value occurring may be predicted. In some embodiments, calculating the probability may entail determining the percentage of times a predicted value occurs in the prediction vector. For example, if the prediction vector P has one million entries, and a predicted value occurs 500,000 times, then the probability of that value occurring is 50%. For example, using the I/O feature set of Table 1, and noting that the first I/O operation cannot produce an LBA change, as there is no previous I/O operation from which to determine an LBA change, the calculated probabilities would be as follows in Table 2.

Returning to method 700, in step 706, a predicted future value having the highest probability from among the calculated probabilities may be determined. For example, using the current example, LBA change of −106679952 (25%) may be selected. It should be noted that in the simple example of Table 1, there is actually another LBA change, +106679952, having the same probability (25%) as −106679952. In actual practice, given the likely much greater number of I/O feature values, the likelihood of two I/O feature values having the same value is extremely low. However, in the event of two I/O feature values having the same value, any of a variety decision mechanisms may be used to select one of the I/O feature values as the one of highest probability.

TABLE 2

LBA Change Probabilities

| LBA Change | Probability |
| --- | --- |
| −106679952 | 25% |
| +26512 | 12.5% |
| +106653440 | 12.5% |
| +106679952 | 25% |
| −26528 | 12.5% |

In step 708, it may be determined whether the highest probability of predicted future values satisfies a probability threshold, for example, the probability threshold described in relation to step 702. It may be desirable to require that such a threshold be met to avoid taking one or more I/O actions if there is insufficient confidence in the accuracy of the predicted value causing the action to be taken. That is, even though the determined highest probability is the highest probability from among values occurring in the prediction vector, it still may not be high enough to warrant taking one or more I/O actions. The value of predetermined probability thresholds may vary based on any of a variety of factors, including, for example, the nature of I/O feature being predicted and the resource cost (e.g., memory and compute) of any actions that may be taken based on the threshold being reached or not reached. For example, different thresholds may be set for LBA change vs. I/O operation change, and for prefetch vs. acquiring cache slots for a write prefetch. Thus, various different thresholds may be defined for various combinations of I/O features and I/O actions. For example, a 70% accuracy threshold may be set for prefetching data for a read, whereas a higher threshold (e.g., 80%) may be set for a prefetch for a write, which involves acquiring cache slots and will cost more in compute and cache resources. Thus, a greater confidence in accuracy may be desired before imposing such cost to avoid wasted cost if the prediction is wrong.

In the context of initially training the prediction engine, if it determined in step 708 that the highest probability value does not satisfy the probability threshold, then method 700 may return to step 704 so that the prediction engine can be trained more. The cycle of steps 704-708 may be repeated until it determined in step 708 that the highest probability value does satisfy the probability threshold, in which case method 700 may proceed to step 710. In step 710, the predicted value of the prediction vector having the highest probability is selected as the predicted value of a next I/O feature. That is, for a next x I/O operations (or for any I/O operation over a predefined period of time; e.g., for a certain storage device), actions may be taken, based at least in part, on the prediction that the I/O operation will exhibit the selected I/O feature value. It should be appreciated that this prediction likely will not be accurate 100% of time, and in fact it likely was not predicted that the predicted value will be correct 100% time, but it was determined by performance of step 708 that the prediction should be correct often enough to justify taking certain actions based on the prediction.

In step 714, the prediction engine may be initially tested using the selected predicted value, for example, against at least a portion of I/O feature set created in step 703. Step 714 may be performed as described in relation to method 900 of FIG. 9, for example, using a different portion of the created I/O feature set created in step 703 than was used to train the prediction engine in step 704.

Figure 9:
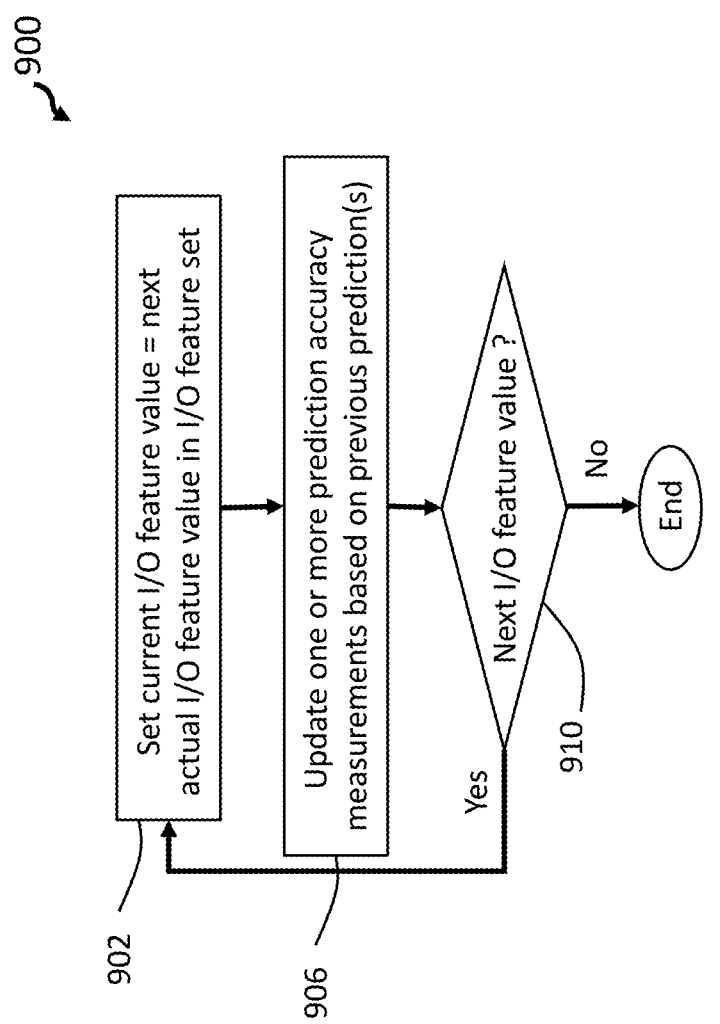
FIG. 9 is a flowchart illustrating an example of a method of testing an I/O prediction engine, according to embodiments of the invention.

FIG. 9 is a flowchart illustrating an example of a method 900 of testing an I/O prediction engine, according to embodiments of the invention. Other embodiments of a method of testing an I/O prediction engine, for example, variations of method 900, are possible and are intended to fall within the scope of the invention.

In step 902, a current I/O feature value may be set equal to a next actual I/O feature value of an I/O feature set (e.g., a portion of the I/O feature set created in step 703). In step 906, one or more prediction accuracy measurements may be updated based on a comparison between the current I/O feature value and the selected predicted I/O feature value (e.g. for a specific storage device). One or more running accuracy measurement values may be maintained over time for feature values. For example, a simple percentage of correct or incorrect predictions, or a ratio of correct vs. incorrect (or vice versa) may be maintained for LBA change or operation change. Also, for LBA change, an accuracy measurement of the degree of accuracy (or inaccuracy) over time may be maintained, for example, by measuring the average amount of error in LBA change in LBA prediction, for example, by application of Equation 7:

$$E_{ave} = \frac{1}{m}\sum_{i=1}^{m}(\hat{y}_i - y_i)$$ Equation 7 where $y_i$ is the actual value (e.g., LBA offset) at time instance i, $\hat{y}_i$ is the selected predicted value (e.g., predicted LBA offset) for time instance i, m=the number of predictions and $E_{ave}$ is the accuracy value, which in essence is the average or mean error of prediction. Step 906 may include updating the ratio or percentages of correct vs. incorrect predictions, and updating $E_{ave}$. Updating the average error may include recalculating Equation 7 or updating the value of $E_{ave}$ using a formula derived from Equation 7 using known mathematical techniques rather than recalculating Equation 7. Other measurements for accuracy may be used. The one or more accuracy measurements also may be used to adjust the prediction engine, for example, as part of adaptive learning, as described in more detail elsewhere herein.

In step 910, it may be determined whether there is a next I/O feature value in the I/O feature set. If there is a next I/O feature value, then method 900 may return to step 902; otherwise, method 900 may end.

Returning to method 700, in step 716, it may be determined whether the prediction accuracy is acceptable. For example, it may be determined whether one or more of the prediction accuracy measurements satisfy predefined thresholds, for example, thresholds defined when setting prediction parameters in step 702 described in relation to FIG. 7 or adjusted thereafter. For example, the ratio or percentage of correct predictions and/or average error described above in relation to step 906 may be compared against predefined thresholds. If it determined in step 716 that the previous prediction accuracy is not acceptable, e.g., does not meet a prediction accuracy threshold, then one or more prediction engine parameters may be manually adjusted in step 718, after which the prediction engine may be tested again in step 714. For example, if the prediction engine is an LSTM, adjusting may include manually adjusting one of the prediction parameters described in more detail elsewhere herein, for example, in relation to step 702, including, but not limited to parameters of gate activation functions and/or output activation functions, e.g., updating the forget gates of the LSTM by scaling the drop-off imposed by the forget gates based on an average prediction error (e.g., determined by application of Equation 7).

Alternatively, if it determined in step 716 that the previous prediction accuracy is not acceptable, e.g., does not meet a prediction accuracy threshold, then method 700 may return to step 704 for additionally training. Although not illustrated in FIG. 7, this alternative also may include manually adjusting prediction engine parameters.

Figure 10:
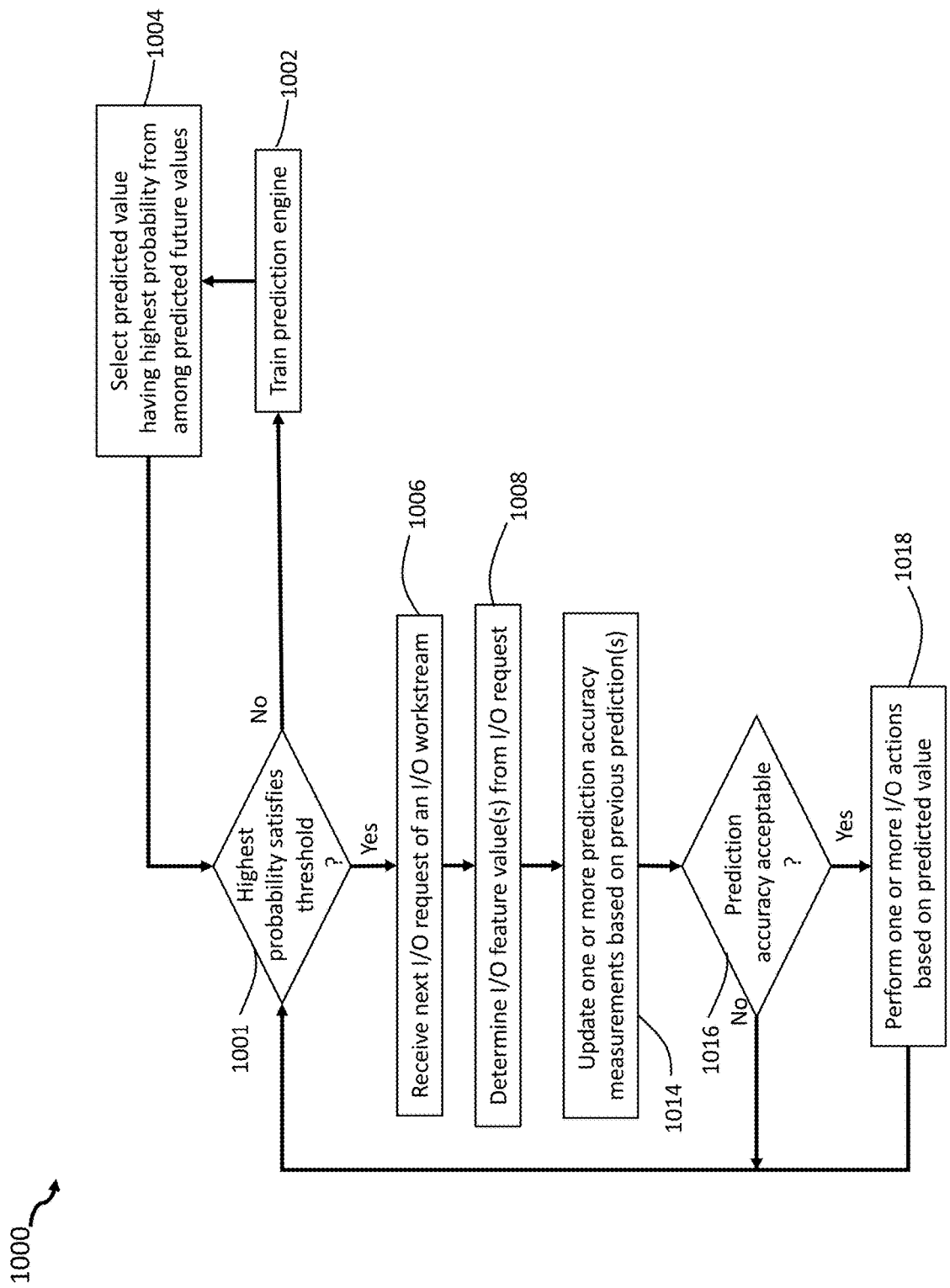
FIG. 10 is a flowchart illustrating an example of a method of applying an I/O prediction engine to an I/O workstream of a storage device, according to embodiments of the invention.

If it determined in step 716 that the previous prediction accuracy is acceptable, e.g., meets a prediction accuracy threshold, then the engine parameters may not be adjusted, and it may be determined that the prediction engine is ready to be run on live data, and method 700 may proceed to step 720 in which the prediction engine is run on live data, for example as described in relation to FIG. 10. In some embodiments, after the prediction engine has been initially trained and tested for a given application, and it's accuracy determined to be sufficient, it may be released or distributed to one or more customers to be used to predict I/O behavior for the application for which it was initially trained and tested. In some embodiments, the prediction engine may be trained and tested on live data and/or shipped to customers prior to any training and testing, and the training and testing may occur on the customer site. While the prediction engine is training or being tested, the prediction engine may be applied to a workstream, in which case no action may be taken for I/O operations until it's accuracy is satisfactory as described in more detail elsewhere herein, or the prediction engine may not be applied to a workstream until training and/or testing is complete.

FIG. 10 is a flowchart illustrating an example of a method 1000 of applying an I/O prediction engine to an I/O workstream of a storage device. Other embodiments of a method of applying an I/O prediction engine to an I/O workstream of a storage device, for example, variations of method 1000, are possible and are intended to fall within the scope of the invention.

In step 1001, it may be determined whether a highest probability of future predicted I/O values determined as a result of training from training the prediction engine satisfies a probability threshold. It should be appreciated that the probability threshold may be changed during performance of method 1000, for example, by a system administrator, and that the highest probability value may change as a result of performance of steps 1002 and 1004. If it is determined that the highest probability is not satisfied, then method 1000 may proceed to step 1002 to re-train the prediction engine and produce a new highest probability. That is, is if a highest probability is not satisfied, it may be determined that it is not worth applying the prediction engine to the workstream and taking actions based on same, for reasons described in more detail elsewhere herein.

It should be appreciated that before or during the performance of steps 1001 and 1006-1018 of method 1000, the prediction engine may be trained or re-trained one or more times in step 1002 based on I/O features determined from the workstream. For example, step 1002 may be performed in accordance with method 800, except that the set of I/O features are derived from I/O operations of the workstream for which method 1000 is being run, e.g., in parallel. Step 1002 may produce a prediction vector P of predicted I/O feature values, for example, in accordance with method 800, and in step 1004 a predicted I/O feature value having the highest probability may be selected from among the I/O feature values of vector P, for example, as described in relation to step 710 of method 700. The performance of steps 1002 and 1004 may be scheduled to occur at specific times, for example, periodically, or in response to an event, e.g., a user instructions or the detection of an event on a storage system. For example, steps 1002 and 1004 may be performed in response to determining in step 1001 that a highest probability of future predicted I/O values determined as a result of training does not satisfy a probability threshold, as described in more detail elsewhere herein.

If it is determined in step 1001 that a highest probability of future predicted I/O values does satisfy a probability threshold in step 1002, then, in response to an I/O request for a storage device received from a host in step 1006, the value of one or more I/O features may be determined from the I/O request in step 1008. For example, the value of one or more I/O features may be determined from the I/O request of the workstream as described above in relation to step 703 of method 700. For example, the change in LBA and/or I/O operation (e.g., read or write) from an immediately preceding I/O request for the storage device and the current I/O request may be determined, and the change in LBA may be rounded off to a nearest unit of LBA range of a predetermined size, for example 8 KB.

In step 1014, one or more prediction accuracy measurements may be updated for the one or more feature values determined in step 1008, for example, as described above in relation to step 906 of method 900. For example, each determined feature value (e.g., LBA change, operation change) may be compared against the selected predicted value (e.g., in step 710 or 1004) for this feature for the storage device. One or more running accuracy measurement values may be maintained over time for feature values. For example, a simple percentage of correct or incorrect predictions, or a ratio of correct vs. incorrect (or vice versa) may be maintained for LBA change or operation change may be maintained. Also, for LBA change, an accuracy measurement of the degree of accuracy (or inaccuracy) over time may be maintained, for example, by measuring the average amount of error in LBA change in LBA prediction, for example, by application of Equation 7. Step 1014 may include updating the ratio or percentages of correct vs. incorrect predictions, and/or updating the average error. Updating the average error may include recalculating Equation 7 or updating the value of $E_{ave}$ using a formula derived from Equation 7 using known mathematical techniques rather than recalculating Equation 7. Other measurements for accuracy may be used, and the one or more accuracy measurements may be used to adjust the prediction engine, for example, as part of adaptive learning as described in more detail elsewhere herein.

In step 1016, it may be determined whether the prediction accuracy is acceptable. For example, it may be determined whether one or more of the prediction accuracy measurements updated in step 1014 satisfy predefined thresholds, for example, thresholds defined when setting prediction parameters in step 702 of method 700 and/or later adjusted as described in more details elsewhere herein. If it is determined that the one or more thresholds are not satisfied, then method 1000 may return to step 1001.

If it is determined in step 1016 that the one or more accuracy thresholds are satisfied, one or more actions may be taken for the storage device in step 1018 based on the selected predicted value (e.g., selected in step 710 or 1004), e.g., any of the I/O actions described elsewhere herein. For example, data may be prefetched into cache from an address range (e.g., sector) of the storage device based on the selected predicted LBA change, and, if a write operation is predicted, one or more cache slots may be pre-acquired for the predicted write operation. Further, if the predicted I/O operation is a write, and the predicted LBA change is within a same sector, a destage of the cache may be prevented until after the write operation is performed. As should be appreciated, any of a variety of other I/O actions may be taken based on the predicted value(s).

It should be appreciated that various parameters of a prediction engine (e.g., LSTM) may be adjusted independent of the prediction accuracy and/or based on the accuracy exceeding a prediction accuracy threshold. For example, the prediction engine may be adjusted to consume less memory and compute resources, e.g., by reducing the window size of an LSTM; i.e., reducing how far it looks into the past, and by reducing the size of the I/O feature sets examined, which may result in less LSTM modules. It may be more acceptable to reduce the memory consumption and compute resources, for example, when accuracy is very good (e.g., as defined by a predefined threshold); i.e., the tradeoff between possible reduction of accuracy for less resource consumption is acceptable.

It should be appreciated that one or more steps of method 1000 may be performed in an order other than the order illustrated in FIG. 8 and that one or more of the steps or portions thereof may be performed in parallel. For example, steps 1004 and 1006 may be performed in parallel to any of steps 1006-1018 of method 1000.

It should be appreciated that the values of different types of I/O features (e.g., LBA change and I/O operation change)

may be predicted separately for the same I/O workstream, using the techniques described herein, for example, using different prediction engines, or different instances of a prediction engine, or a single prediction engine configured to determine the different types of I/O features. Further, it should be appreciated that predictions, probabilities, accuracy measures and thresholds may be calculated and/or defined for combinations of I/O features, as opposed to the I/O features individually, i.e., the combination of LBA change and I/O operation change (e.g., a 46% change of a transition from a "read" to a "a write" with an LBA change of 191466648 8K units).

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 700, 800, 900 and 1000 or parts thereof, may be implemented using one or more of the systems or data structures described in relation to FIGS. 1-4 or components thereof. Further, various aspects of the invention may be implemented using software, hardware, a combination of software and hardware and/or other computer-implemented modules or devices having the described features and performing the described functions.

Software implementations of embodiments of the invention may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
    receiving a first I/O request for a storage device of a storage system, the first I/O request corresponding to a first storage location on the storage system;
    determining a difference between the first storage location and a second storage location on the storage system corresponding to a second storage I/O request for the storage device that immediately preceded the first I/O request;
    predicting a third storage location corresponding to a next I/O request for the storage device based at least in part on the difference between the first storage location and the second location;
    predicting a type of I/O operation of the next I/O request, including predicting whether the type of I/O operation is a read operation or a write operation; and
    if the predicted type of I/O operation is a write operation from a host system, acquiring cache space into which write data for the next I/O request from the host system is to be initially written and later destaged from the cache space to a physical storage device of the storage system,
    wherein predicting a third storage location includes:
        determining a plurality of potential location difference values based on a plurality of I/O requests for the storage device received prior to the first I/O request, each potential location difference value specifying a difference in storage location address;
        determining, for each potential location difference value, a probability value indicating a probability that the difference in storage location address specified by the potential location difference value will be within a predefined range of a difference in storage location address between the first storage location and a storage location corresponding to the next I/O request;
        selecting a potential location difference value having a highest probability value from among the determined probability values; and
        determining the third storage location based on the first storage location and the selected location difference value.

2. The method of claim 1, further comprising:
    performing one or more I/O actions based at least in part on the predicted third storage location.

3. The method of claim 1, further comprising:
    if the predicted type of I/O operation is a read operation, prefetching data corresponding to the third storage location.

4. The method of claim 1, wherein the first I/O request specifies a type of I/O operation, and wherein predicting the type of I/O operation of the next I/O request includes:
    determining a difference between the type of operation specified in the first I/O request and a type of I/O operation specified in the second storage I/O request; and
    predicting the type of I/O operation to be specified in the next I/O request for the storage device based at least in part on the difference between the type of I/O operation of the first I/O request and the type of I/O operation of the second I/O request.

5. The method of claim 1, further comprising:
    performing a plurality of predictions of storage locations corresponding to I/O requests for the storage device prior to the first I/O request;
    calculating an accuracy value indicating a collective accuracy of the plurality of predictions; and
    determining whether to perform one or more I/O actions in accordance with the predicted third storage location based at least in part on the accuracy value.

6. The method of claim 1, wherein predicting the third storage location includes application of a prediction engine, the method further comprising:
    performing a plurality of predictions of storage locations corresponding to I/O requests for the storage device prior to the first I/O request;
    calculating an accuracy value indicating a collective accuracy of the plurality of predictions; and
    adjusting one or more parameters of the prediction engine based on the accuracy value.

7. The method of claim 1, wherein at least one of predicting the third storage location and predicting a type of I/O operation includes applying a recurrent neural network.

8. The method of claim 7, wherein the recurrent neural network is an LSTM-RNN.

9. A data storage system comprising:
a storage device,
one or more processors; and
a memory comprising code stored thereon that, when executed, performs a method comprising:
receiving a first I/O request for the storage device, the first I/O request corresponding to a first storage location on the storage system;
determining a difference between the first storage location and a second storage location on the storage system corresponding to a second storage I/O request for the storage device that immediately preceded the first I/O request;
predicting a third storage location corresponding to a next I/O request for the storage device based at least in part on the difference between the first storage location and the second location;
predicting a type of I/O operation of the next I/O request, including predicting whether the type of I/O operation is a read operation or a write operation; and
if the predicted type of I/O operation is a write operation from a host system, acquiring cache space into which write data for the next I/O request from the host system is to be initially written and later destaged from the cache space to a physical storage device of the storage system,
wherein predicting a third storage location includes:
determining a plurality of potential location difference values based on a plurality of I/O requests for the storage device received prior to the first I/O request, each potential location difference value specifying a difference in storage location address;
determining, for each potential location difference value, a probability value indicating a probability that the difference in storage location address specified by the potential location difference value will be within a predefined range of a difference in storage location address between the first storage location and a storage location corresponding to the next I/O request;
selecting a potential location difference value having a highest probability value from among the determined probability values; and
determining the third storage location based on the first storage location and the selected location difference value.

10. The system of claim 9, the method further comprising:
performing one or more I/O actions based at least in part on the predicted third storage location.

11. The method of claim 9, further comprising:
if the predicted type of I/O operation is a read operation, prefetching data corresponding to the third storage location.

12. The system of claim 9, wherein the first I/O request specifies a type of I/O operation, and wherein predicting the type of I/O operation of the next I/O operation includes:
determining a difference between the type of operation specified in the first I/O request and a type of I/O operation specified in the second storage I/O request; and
predicting the type of I/O operation to be specified in the next I/O request for the storage device based at least in part on the difference between the type of I/O operation of the first I/O request and the type of I/O operation of the second I/O request.

13. The system of claim 9, wherein at least one of predicting the third storage location and predicting a type of I/O operation includes applying an LSTM-RNN.

14. One or more non-transitory computer-readable media having software stored thereon comprising:
executable code that receives a first I/O request for the storage device, the first I/O request corresponding to a first storage location on the storage system;
executable code that determines a difference between the first storage location and a second storage location on the storage system corresponding to a second storage I/O request for the storage device that immediately preceded the first I/O request;
executable code that predicts a third storage location corresponding to a next I/O request for the storage device based at least in part on the difference between the first storage location and the second location;
executable code that predicts a type of I/O operation of the next I/O request, including predicting whether the type of I/O operation is a read operation or a write operation; and
executable code that, if the predicted type of I/O operation is a write operation from a host system, acquires cache space into which write data for the next I/O request from the host system is to be initially written and later destaged from the cache space to a physical storage device of the storage system,
wherein the executable code that predicts a third storage location includes:
executable code that determines a plurality of potential location difference values based on a plurality of I/O requests for the storage device received prior to the first I/O request, each potential location difference value specifying a difference in storage location address;
executable code that determines, for each potential location difference value, a probability value indicating a probability that the difference in storage location address specified by the potential location difference value will be within a predefined range of a difference in storage location address between the first storage location and a storage location corresponding to the next I/O request;
executable code that selects a potential location difference value having a highest probability value from among the determined probability values; and
executable code that determines the third storage location based on the first storage location and the selected location difference value.

15. The one or more non-transitory computer-readable media of claim 14, the software further comprising:
executable code to initiate performing one or more I/O actions based at least in part on the predicted third storage location.

16. The one or more non-transitory computer-readable media of claim 14, wherein at least one of the executable code that predicts the third storage location and the executable code that predicts a type of I/O operation includes executable code that applies an LSTM-RNN.

* * * * *